US010916897B1

(12) United States Patent
Ramunno et al.

(10) Patent No.: US 10,916,897 B1
(45) Date of Patent: Feb. 9, 2021

(54) BATTERY MOUNTED FUSE HOLDER

(71) Applicant: AEES Inc., Farmington Hills, MI (US)

(72) Inventors: David A. Ramunno, Milford, MI (US); Todd Wisneski, Novi, MI (US)

(73) Assignee: AEES Inc., Farmington Hills, MI (US)

( * ) Notice: Subject to any disclaimer, the term of this patent is extended or adjusted under 35 U.S.C. 154(b) by 0 days.

(21) Appl. No.: 16/790,343

(22) Filed: Feb. 13, 2020

(51) Int. Cl.

| | |
|---|---|
| ***H01R 13/688*** | (2011.01) |
| ***H01R 13/506*** | (2006.01) |
| ***H01R 13/627*** | (2006.01) |
| ***H01R 13/631*** | (2006.01) |
| ***H01M 2/34*** | (2006.01) |
| ***B60R 16/02*** | (2006.01) |
| ***H01R 13/52*** | (2006.01) |

(52) U.S. Cl.
CPC ....... *H01R 13/688* (2013.01); *B60R 16/0215* (2013.01); *H01M 2/348* (2013.01); *H01R 13/506* (2013.01); *H01R 13/5202* (2013.01); *H01R 13/6271* (2013.01); *H01R 13/631* (2013.01); *H01M 2200/103* (2013.01); *H01M 2220/20* (2013.01); *H01R 2201/26* (2013.01)

(58) Field of Classification Search
CPC ...... H01C 3/688; H01C 3/506; H01C 3/5202; H01C 3/6271; H01C 3/631; B60R 16/0215
See application file for complete search history.

(56) References Cited

U.S. PATENT DOCUMENTS

| | | | |
|---|---|---|---|
| 2,204,948 | A | 6/1940 | Pond |
| 4,199,214 | A | 4/1980 | Pearce, Jr. et al. |
| 4,218,109 | A | 8/1980 | Kneusels |

(Continued)

FOREIGN PATENT DOCUMENTS

| | | | |
|---|---|---|---|
| CN | 2443486 | Y | 8/2001 |
| CN | 1684215 | A | 10/2005 |

(Continued)

OTHER PUBLICATIONS

Chinese Search Report for Application CN2015800798476 dated Nov. 5, 2018, 5 pages.

(Continued)

*Primary Examiner* — Abdullah A Riyami
*Assistant Examiner* — Nader J Alhawamdeh
(74) *Attorney, Agent, or Firm* — Howard & Howard Attorneys PLLC

(57) ABSTRACT

A wiring harness assembly for serviceably housing an electrical fuse includes at least one electrical cable, a wiring harness plug mounted to the cable and including a first electrical connector, a first terminal having a mounting end for receiving an energized stud and at least one first fuse contacting end, at least one second terminal including a second electrical connector and a second fuse contacting end, and a terminal housing including a main body defining a first cavity and a receptacle defining a second cavity, wherein the first fuse contacting end of the first terminal and the second fuse contacting end of the second terminal are positioned within the first cavity, and wherein the receptacle is configured to receive the wiring harness plug including the first electrical connector with the first and second electrical connectors engaging each other in electrical communication.

20 Claims, 9 Drawing Sheets

(56) References Cited

U.S. PATENT DOCUMENTS

| | | | |
|---|---|---|---|
| 4,280,748 | A | 7/1981 | McHenney et al. |
| 4,391,485 | A | 7/1983 | Urani |
| 4,648,674 | A | 3/1987 | Sanchez, Jr. |
| 4,731,032 | A | 3/1988 | Noorily |
| 4,830,631 | A | 5/1989 | Hsueh |
| 4,836,802 | A | 6/1989 | Phillips |
| 4,997,394 | A | 3/1991 | Katz et al. |
| 5,088,940 | A | 2/1992 | Saito |
| 5,171,293 | A | 12/1992 | Umemoto et al. |
| 5,645,448 | A | 7/1997 | Hill |
| 5,752,856 | A | 5/1998 | Boutin et al. |
| 5,805,047 | A | 9/1998 | De Villeroche et al. |
| 5,825,274 | A | 10/1998 | Totsuka |
| 5,841,337 | A | 11/1998 | Douglass |
| 5,929,739 | A | 7/1999 | Totsuka |
| 6,050,856 | A | 4/2000 | Sugiura |
| 6,162,098 | A | 12/2000 | Cheng |
| 6,165,020 | A | 12/2000 | Cheng |
| 6,227,913 | B1 | 5/2001 | Davis et al. |
| 6,283,794 | B1 | 9/2001 | Osuga |
| 6,294,978 | B1 | 9/2001 | Endo et al. |
| 6,512,443 | B1 | 1/2003 | Matsumura |
| 6,607,860 | B2 | 8/2003 | Hulbert et al. |
| 6,666,722 | B2 | 12/2003 | Fukumori |
| 6,726,506 | B2 | 4/2004 | Fukumori |
| 6,784,783 | B2 | 8/2004 | Scoggin |
| 6,855,008 | B1 | 2/2005 | Freitag et al. |
| 6,932,650 | B1 | 8/2005 | Freitag |
| 7,046,115 | B2 | 5/2006 | Higuchi |
| 7,192,319 | B1 | 3/2007 | Rahman |
| 7,292,130 | B2 | 11/2007 | Taga |
| 7,377,813 | B2 | 5/2008 | Pentell et al. |
| 7,413,488 | B2 | 8/2008 | Matsumura |
| 7,445,509 | B2 | 11/2008 | Korczynski |
| 7,772,959 | B2 | 8/2010 | Cheng |
| 7,802,998 | B2 | 9/2010 | Taguchi |
| 7,878,822 | B2 | 2/2011 | Korczynski et al. |
| 7,924,136 | B2 | 4/2011 | Darr et al. |
| 7,924,137 | B2 | 4/2011 | Rahman |
| 7,948,353 | B2 | 5/2011 | Deno |
| 8,009,010 | B2 | 8/2011 | Pentell et al. |
| 8,242,874 | B2 | 8/2012 | Pavlovic et al. |
| 8,382,525 | B2 | 2/2013 | Shiraki |
| 8,638,188 | B2 | 1/2014 | Iwata |
| 9,124,081 | B2 | 9/2015 | Kowtun et al. |
| 9,203,221 | B2 | 12/2015 | Kamigaichi |
| 9,384,929 | B2 | 7/2016 | Masuda |
| 9,425,018 | B2 | 8/2016 | Nohara |
| 9,589,756 | B2 | 3/2017 | Saimoto |
| 10,320,129 | B2 * | 6/2019 | Ramunno ............ H01R 13/688 |
| 2003/0179070 | A1 | 9/2003 | Izumi |
| 2004/0192113 | A1 | 9/2004 | Yamashita |
| 2005/0237147 | A1 | 10/2005 | Carreras |
| 2005/0275499 | A1 | 12/2005 | Kita |
| 2006/0003627 | A1 | 1/2006 | Freitag |
| 2008/0218304 | A1 | 9/2008 | Pentell et al. |
| 2008/0242150 | A1 | 10/2008 | Chikamatsu |
| 2009/0309689 | A1 | 12/2009 | Pavlovic et al. |
| 2011/0306243 | A1 | 12/2011 | Shiraki |
| 2018/0076575 | A1 * | 3/2018 | Ramunno ............ H01R 11/287 |
| 2019/0123495 | A1 | 4/2019 | Darr et al. |

FOREIGN PATENT DOCUMENTS

| | | | |
|---|---|---|---|
| CN | 101969013 | A | 2/2011 |
| CN | 102157279 | A | 8/2011 |
| EP | 2533363 | A1 | 12/2012 |
| JP | 200787823 | A | 4/2007 |
| JP | 2008247496 | A | 10/2008 |
| WO | 2005029646 | A2 | 3/2005 |
| WO | 2015012221 | A1 | 1/2015 |

OTHER PUBLICATIONS

Computer-generated English language translation for CN1684215A extracted from espacenet.com database on Jan. 17, 2019, 12 pages.
English language abstract for CN 101969013 A extracted from espacenet.com database on Apr. 29, 2020, 2 pages.
English language abstract for CN102157279A extracted from espacenet.com database on Jan. 17, 2019, 2 pages.
English language abstract for CN2443486Y extracted from espacenet.com database on Jan. 17, 2019, 1 page.
English language abstract for JP 200787823 A extracted from espacenet.com database on Apr. 29, 2020, 1 page.
English language abstract for JP 2008-247496 A extracted from espacenet.com database on Apr. 20, 2020, 1 page.
English language abstract for WO 2015/012221 A1 extracted from espacenet.com database on Apr. 20, 2020, 2 pages.
English language abstract of JP200787823; downloaded from espacenet.com on Sep. 13, 2017; 22 pages.
European Search Report for Application EP15884877 dated Oct. 1, 2018, 2 pages.
International Search Report for PCT/US2015/020143; dated Jun. 26, 2015; 9 pages.

* cited by examiner 80
20
78
128, 132
84
122
62
44
114
116
60
56
50
40
108
52
106
116
42
104
54
34
38
58
32

80
78
124
124
82
85
85
84
84
86
86
88
132
132
38
128
90
40
128
68, 76
60, 66
32
36
34

BATTERY MOUNTED FUSE HOLDER

TECHNICAL FIELD

The present invention relates generally to wiring harnesses for vehicles and, more particularly, to a battery mounted assembly for holding a fuse for a vehicle.

BACKGROUND

It is known to provide a fuse holder for a removable electrical fuse but there is a need in the art to include a wiring harness connector on a battery mounted fuse holder.

SUMMARY OF THE INVENTION

Accordingly, the present invention provides a wiring harness assembly for serviceably housing an electrical fuse. The wiring harness assembly includes at least one electrical cable, and a wiring harness plug mounted to the cable. The wiring harness plug includes a harness housing and a first electrical connector. The wiring harness assembly also includes a terminal housing including a main body defining a first cavity and a receptacle defining a second cavity. The wiring harness assembly further includes a first terminal including a mounting end adapted for receiving a stud, and at least one first fuse contacting end disposed within the first cavity of the terminal housing. The wiring harness assembly also further includes at least one second terminal including a first end defining a second electrical connector disposed within the second cavity of the terminal housing, and at least one second fuse contacting end disposed within the first cavity of the terminal housing. The first fuse contacting end of the first terminal and the second fuse contacting end of the second terminal are positioned within the first cavity parallel to and facing each other for receiving the electrical fuse. Additionally, the receptacle of the terminal housing receives the wiring harness plug with the first and second electrical connectors engaging each other in electrical communication to electrically couple the cable to the first and second terminals.

The wiring harness assembly additionally includes a cover removably mounted to the terminal housing to sealably cover the first cavity for protecting the electrical fuse within the first cavity, and a retaining system interconnecting the cover and the housing to maintain connection of the cover to the housing when the cover is removed from the housing. The retaining system includes a tether mounted to one of the cover and the housing and an attachment fixture mounted to the other of the cover and the housing.

Advantages of the present disclosure will be readily appreciated as the same becomes better understood by reference to the following detailed description when considered in connection with the accompanying drawings.

DETAILED DESCRIPTION

Figure 1:
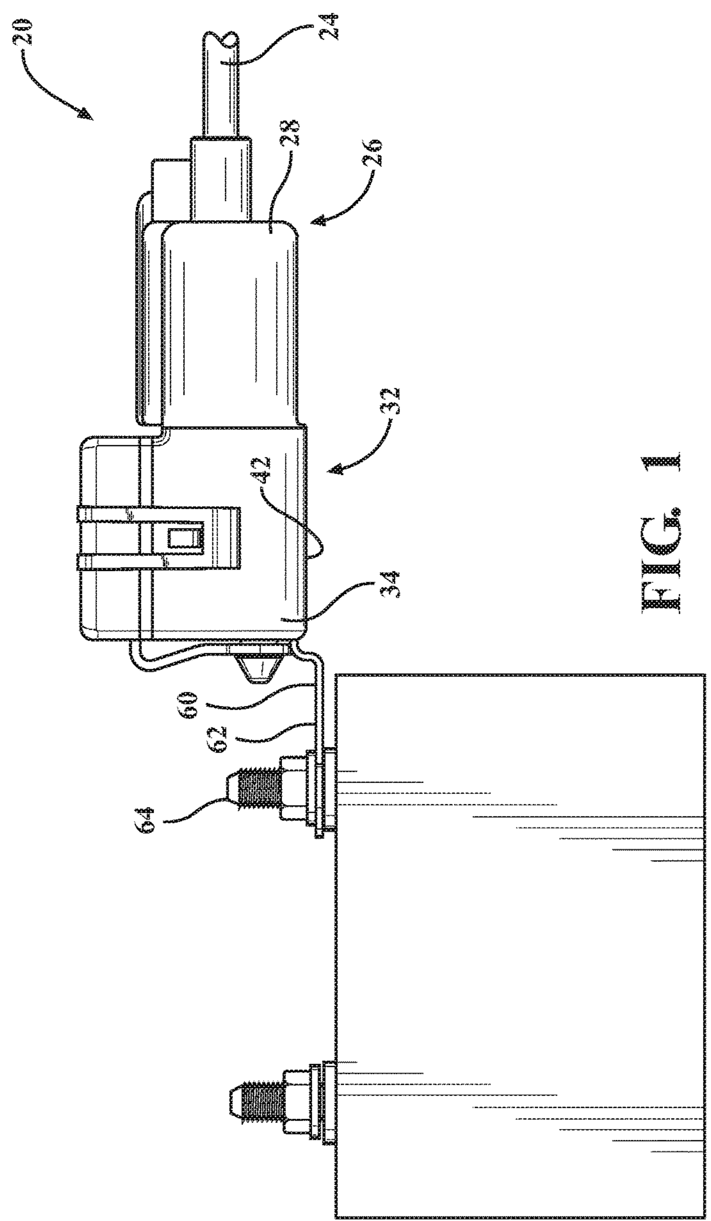
FIG. 1 is a partially schematic side view of a wiring harness assembly illustrated in operational relationship with a stud extending from a battery.
Figure 2:
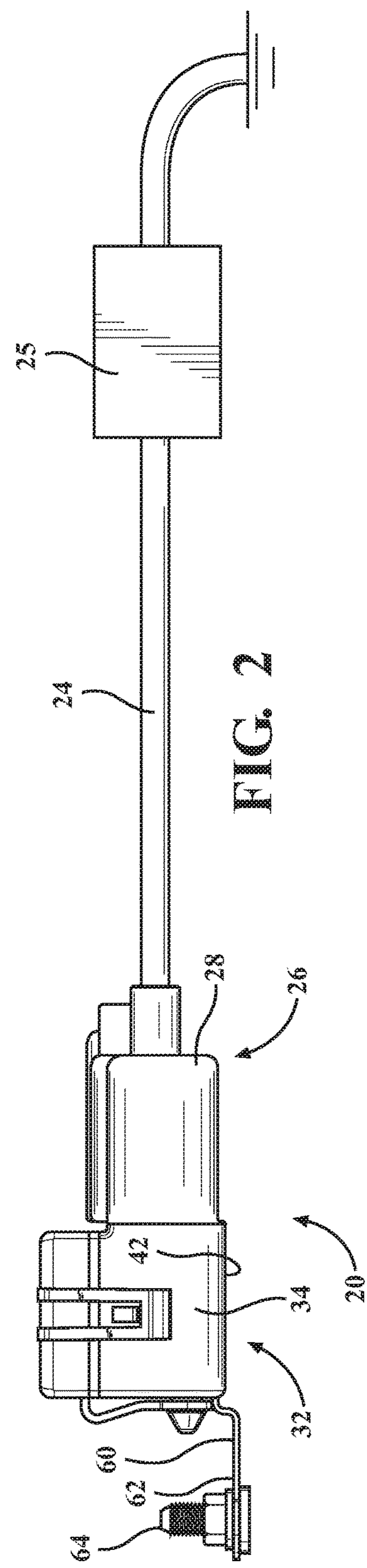
FIG. 2 is a partially schematic side view of the wiring harness assembly of FIG. 1 illustrated in operational relationship with a stud and a load.

FIG. 1 and FIG. 2 show a wiring harness assembly 20 for serviceably housing at least one electrical fuse 22. In the illustrated embodiment, the wiring harness assembly 20 is coupled between an electrical cable 24 and a stud 64. The stud 64, for example, may be an energized stud extending from an electrical component of a vehicle (not shown), such as an alternator or battery. The electrical cable 24 may be connected to a load 25. It should be appreciated that the wiring harness assembly 20 may be used in other embodiments for the vehicle other than the electrical cable 24 and the stud 64.

Figure 3:
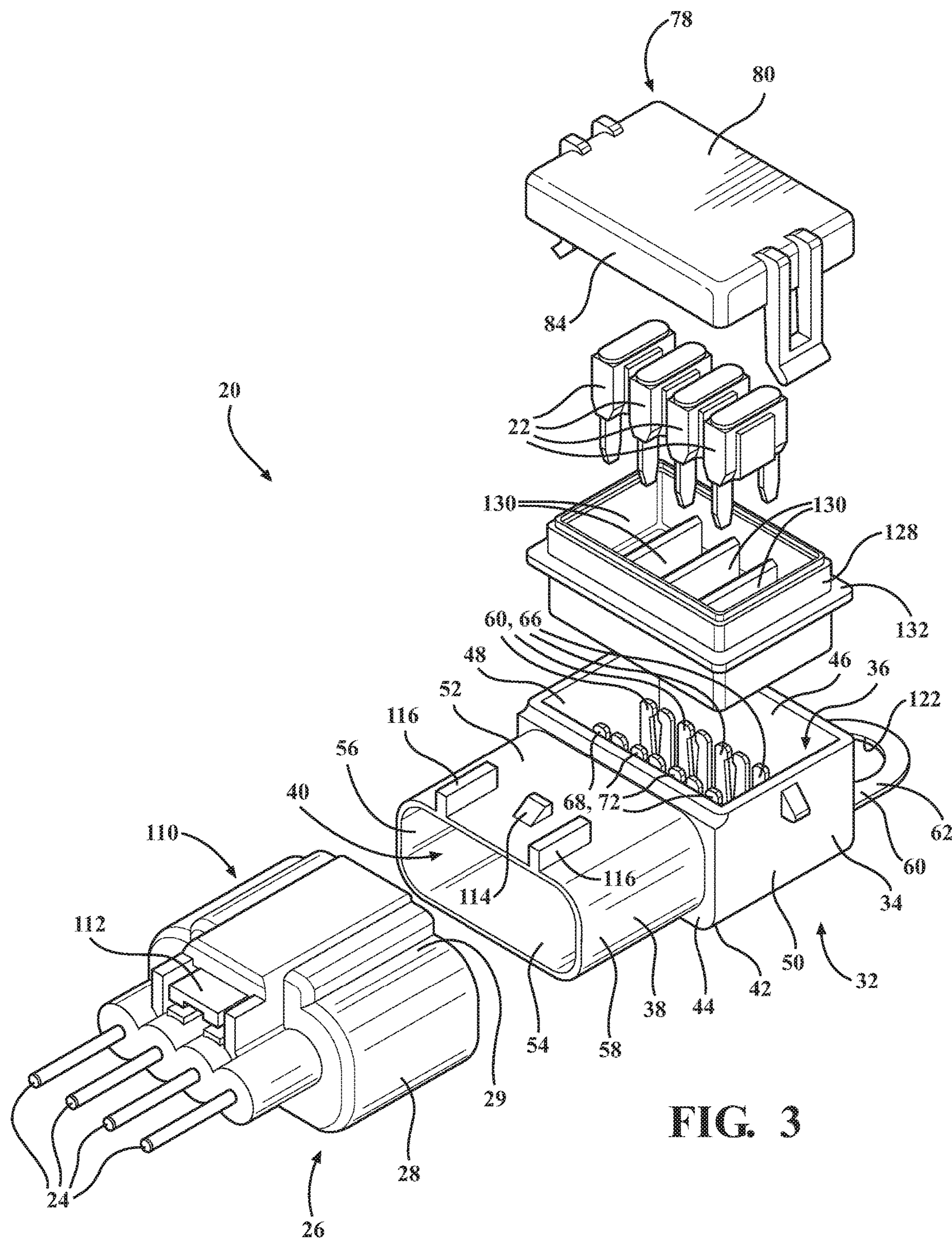
FIG. 3 is an exploded view of the wiring harness assembly of FIG. 1.

With reference to FIGS. 1-3, the wiring harness assembly 20 includes at least one electrical cable 24 and a wiring harness plug 26 mounted to the cable 24. The wiring harness assembly 20 also includes a terminal housing 32 including a main body 34 defining a first cavity 36 and a receptacle 38 defining a second cavity 40. The main body 34 of the terminal housing 32 includes a base 42, a first side 44 and a second side 46 spaced apart from each other and extending perpendicularly from the base 42, and a third side 48 and a fourth side 50 spaced apart from each other, perpendicular to the first side 44 and the second side 46, and extending perpendicularly from the base 42. Collectively, the first side 44, second side 46, third side 48, and fourth side 50 form a generally rectangular cross section extending from the base 42 to define the main body 34 and the first cavity 36. It is contemplated that the receptacle 38 may have a variety of dimensions (such as various depths, aspect ratios) and internal features (such as ribs for structural integrity).

The receptacle 38 of the terminal housing 32 includes a top side 52 and a bottom side 54 spaced apart from each other and extending perpendicularly from the first side 44 of the main body 34, and a left side 56 and a right side 58 spaced apart from each other, perpendicular to the top side 52 and the bottom side 54, and extending perpendicularly from the first side 44 of the main body 34. Collectively, the top side 52, bottom side 54, left side 56, and right side 58 form a generally rectangular cross section extending from the first side 44 of the main body 34 to define the receptacle 38 and the second cavity 40. It is contemplated that the receptacle 38 may have a variety of dimensions (such as various depths, aspect ratios) and internal features (such as ribs for structural integrity).

With references to FIGS. 3-6, the wiring harness assembly 20 includes a first terminal 60. The first terminal 60 includes at least one first fuse contacting end 66 disposed within the first cavity 36 of the terminal housing 32 and a mounting end 62 extending from the housing 32. The mounting end 62 may define an aperture 122. The aperture 122 may be open ended, generally circular in shape, or may have any suitable shape and may be configured to receive the stud 64. The wiring harness assembly 20 also includes at least one second terminal 68 including a first end defining a second electrical connector 72 disposed within the second cavity 40 of the terminal housing 32, and at least one second fuse contacting end 76 disposed within the first cavity 36 of the terminal housing 32.

Figure 5:
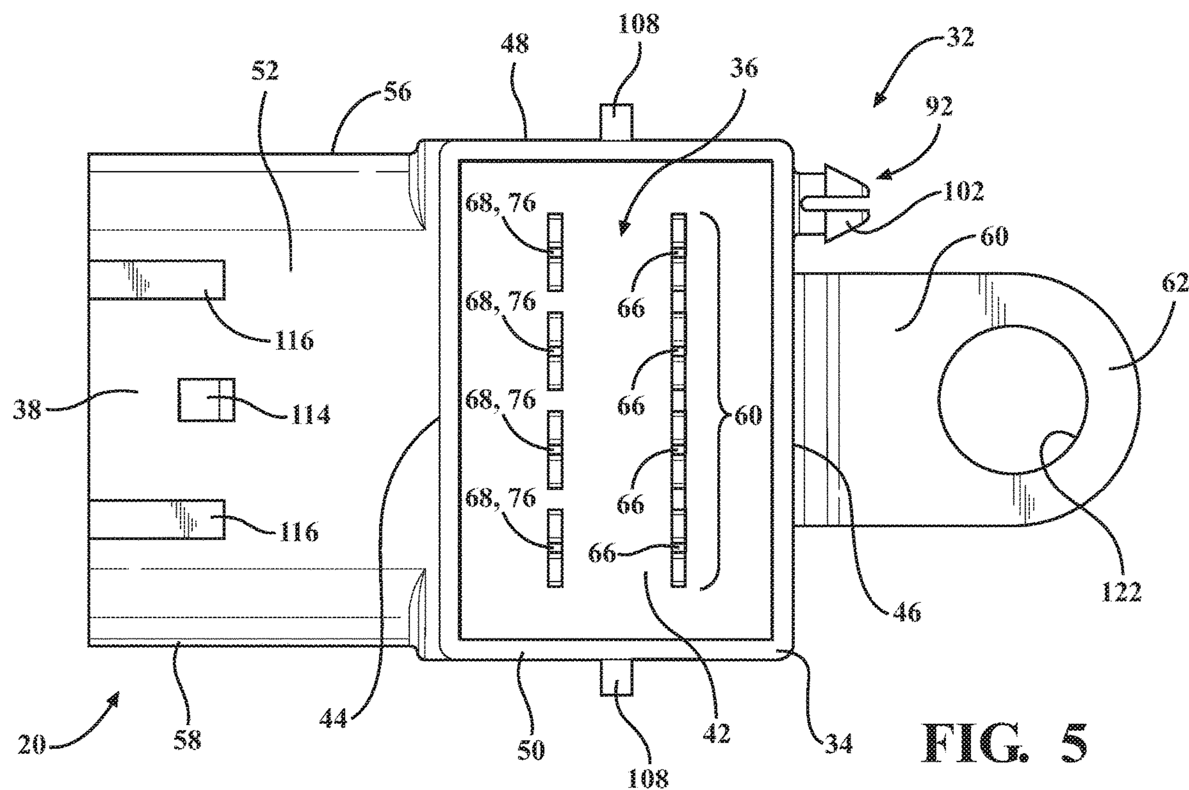
FIG. 5 is a plan view of the terminal housing of FIG. 4 including the first terminal and a second terminal.
Figure 7:
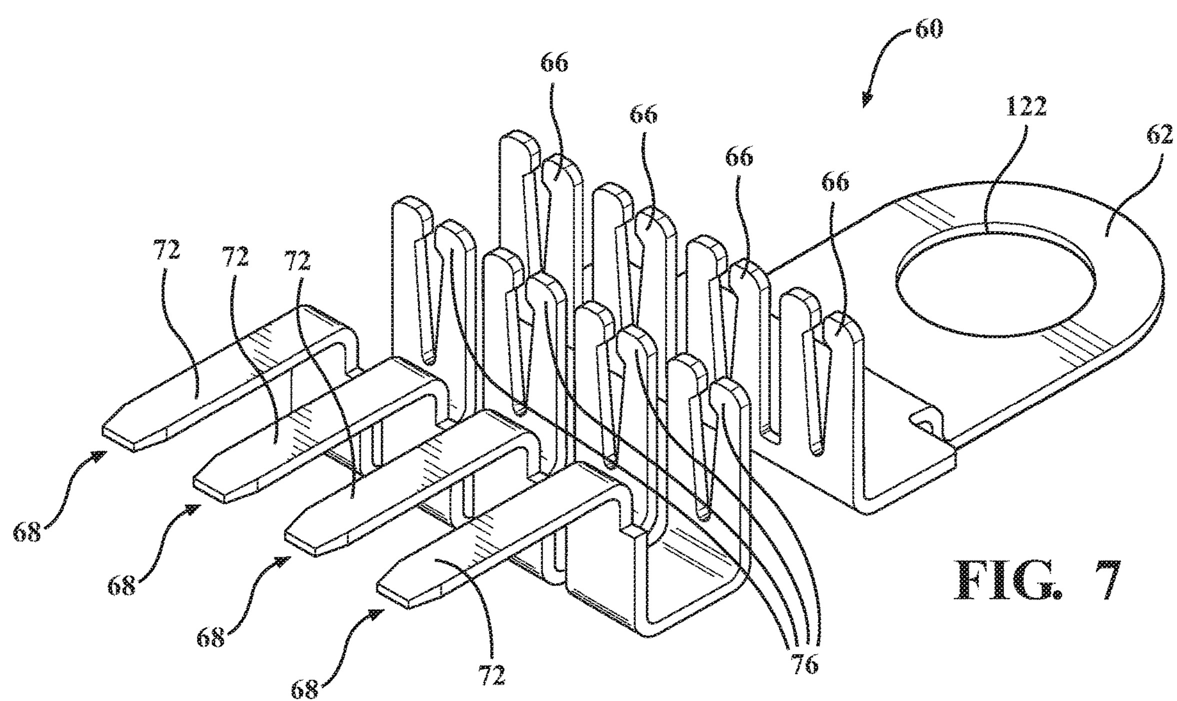
FIG. 7 is a perspective view of the first terminal and a plurality of second terminals.

Referring to FIG. 5 and FIG. 7, in one embodiment the at least one second terminal 68 may be defined as a plurality of the second terminals 68 wherein each of the second fuse contacting ends 76 are spaced apart from each other for receiving a plurality of electrical fuses 22 and each of the second electrical connectors 72 are spaced apart from each other such that the plurality of second terminals 68 are parallel to each other.

With reference to FIG. 7, which illustrates the first terminal 60 and second terminal(s) 68 with the terminal housing 32 hidden, in one embodiment, the at least one first fuse contacting end 66 of the first terminal 60 may be further defined as a plurality of first fuse contacting ends 66, with each of the first fuse contacting ends 66 being spaced apart from each other for receiving a plurality of electrical fuses 22. Also, in one embodiment, the plurality of the first fuse contacting ends 66 and the mounting end 62 may be integrally connected, and the mounting end 62 of the first terminal 60 may be further defined as a single mounting end 62 for receiving the stud 64. In other words, the plurality of the first fuse contacting ends 66 and the single mounting end 62 define the single first terminal 60 that is capable of receiving a plurality of fuses 22 using the plurality of first fuse contacting ends 66.

Figure 6:
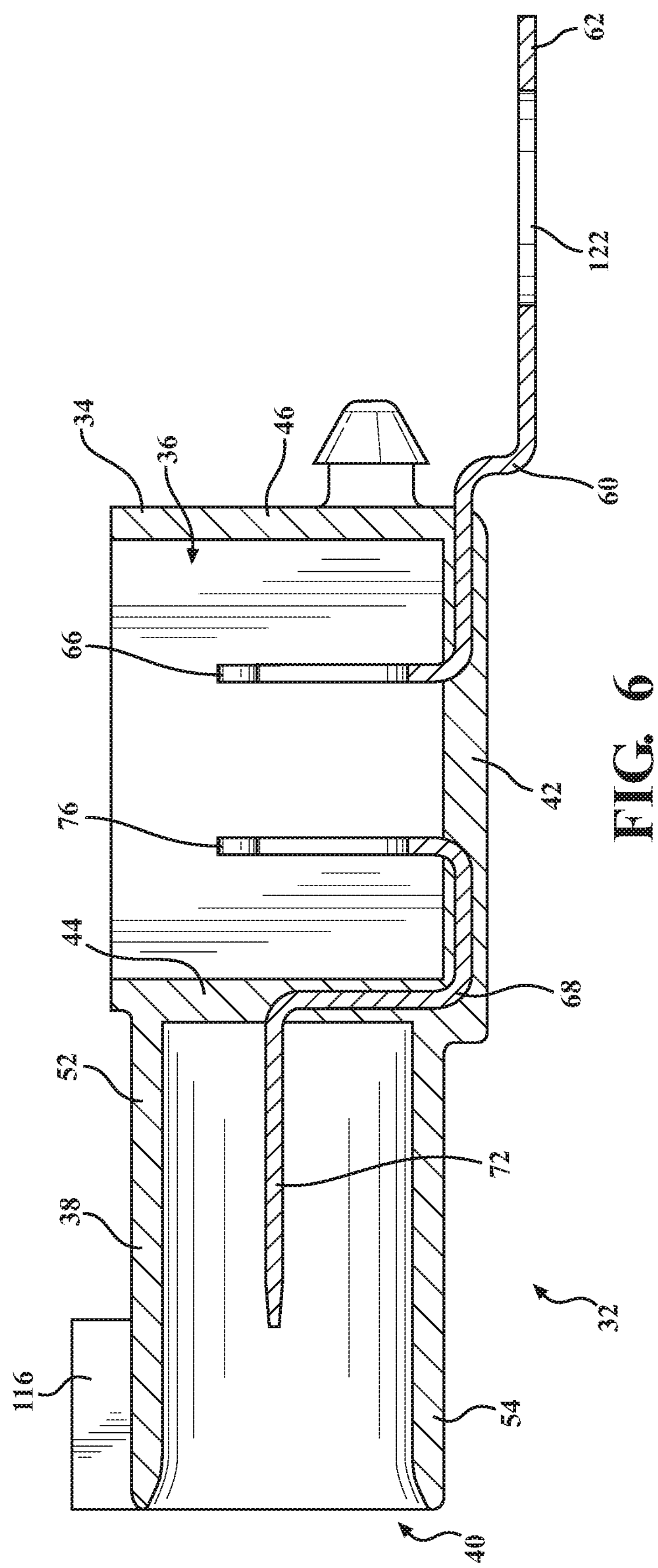
FIG. 6 is an offset cross-sectional view of the terminal housing including first terminal and the second terminal.

Referring to FIGS. 5-7, the first fuse contacting end(s) 66 of the first terminal 60 and the second fuse contacting end(s) 76 of the second terminal(s) 68 are positioned within the first cavity 36 parallel to and facing each other for receiving the electrical fuse 22. Particularly, FIGS. 5-7 illustrate that the first fuse contacting end(s) 66 and the second fuse contacting end(s) 76 are arranged within the first cavity 36 such that the first fuse contacting end(s) 66 and the second fuse contacting end(s) 76 are parallel to each other as well as the first side 44 and second side 46 of the main body 34. Furthermore, FIGS. 5 and 6 illustrates that the first fuse contacting end(s) 66 and the second fuse contacting end(s) 76 are spaced apart from and facing each other within the first cavity 36 such that the first fuse contacting end(s) 66 and the second fuse contacting end(s) 76 are capable of receiving one or more fuses 22. The first terminal 60 and second terminal(s) 68 may be installed in the terminal housing using a variety of methods. For example, the terminal housing 32 may be overmolded over the first terminal 60 and second terminal(s) 68.

Figure 8:
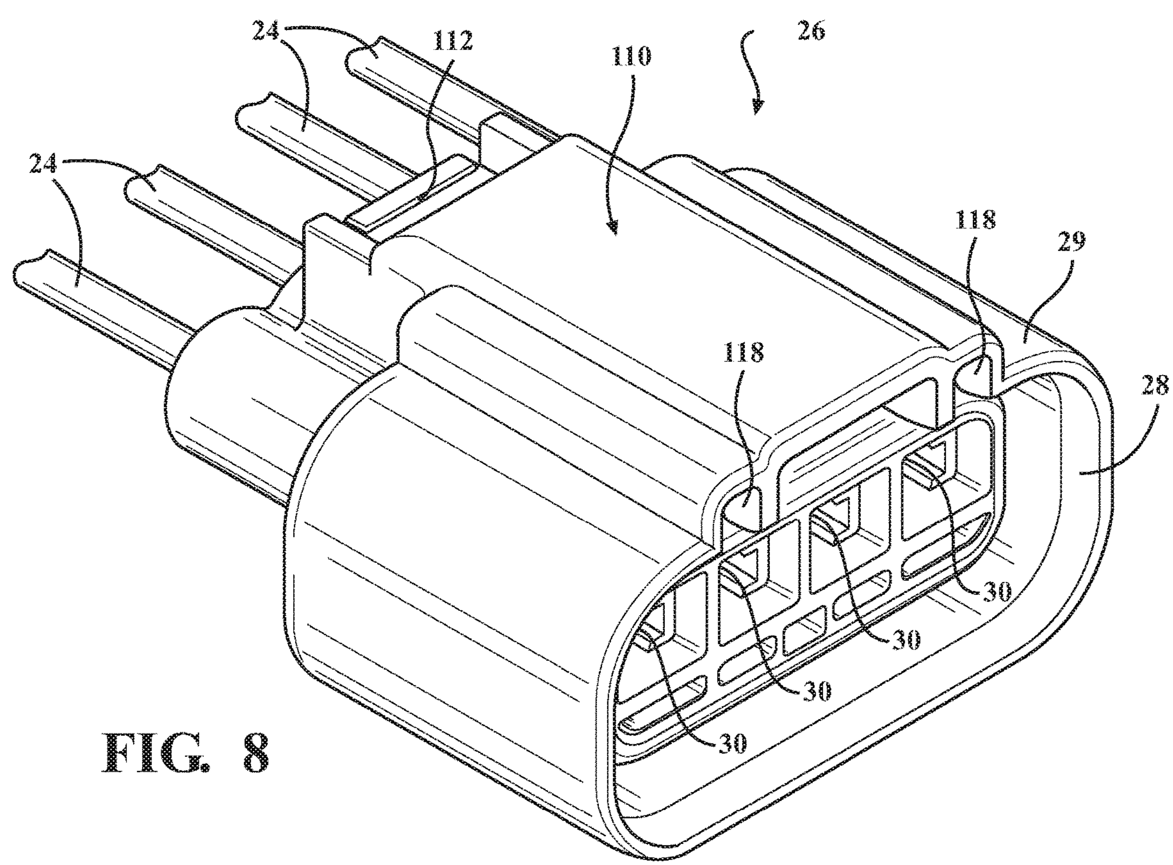
FIG. 8 is a perspective view of a wiring harness plug.
Figure 9:
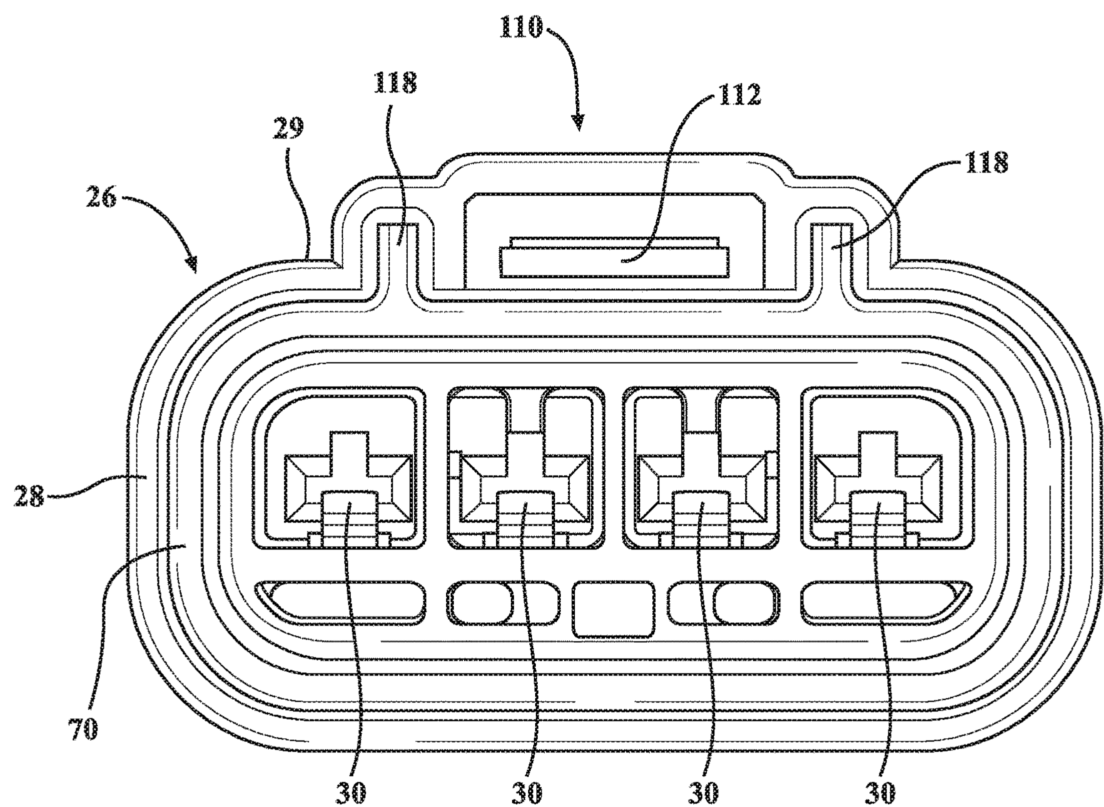
FIG. 9 is an end view of the wiring harness plug.
Figure 10:
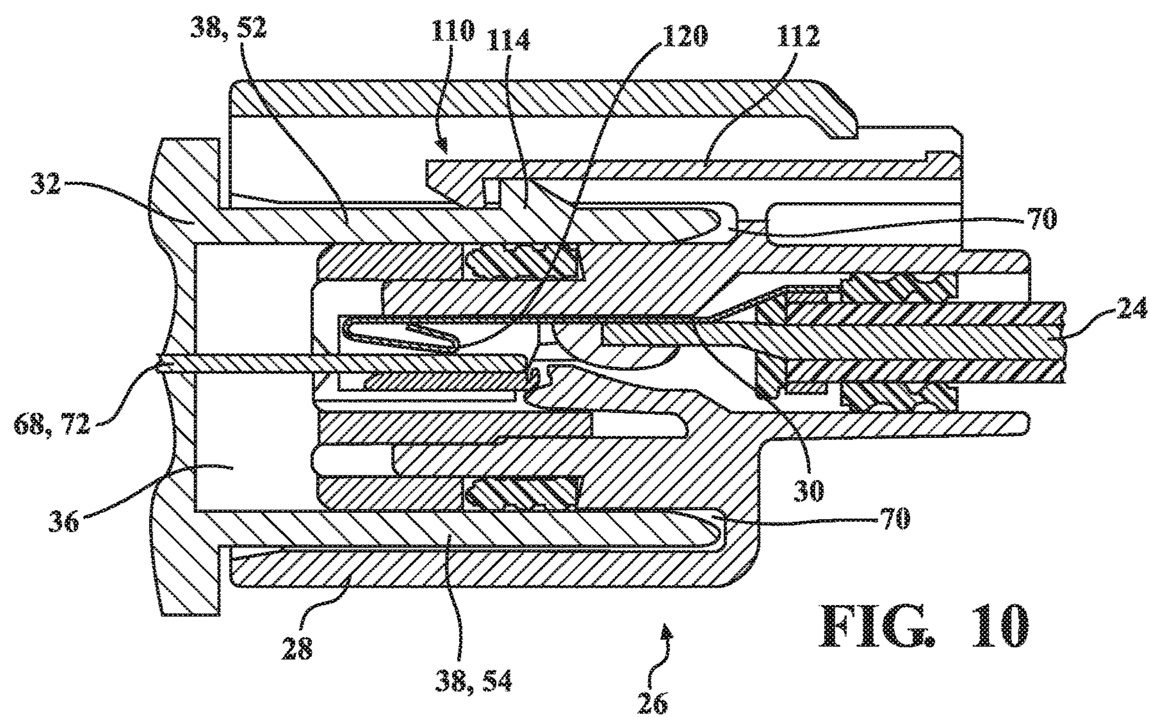
FIG. 10 is an offset partial cross-sectional view of the wiring harness plug and the terminal housing.
Figure 11:
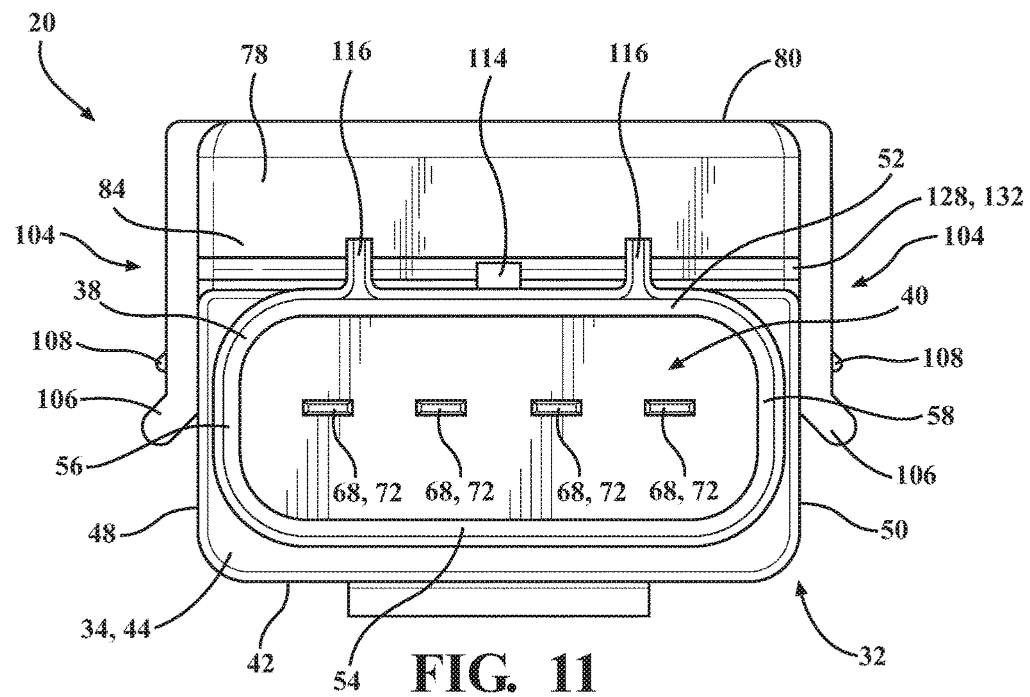
FIG. 11 is an end view of the terminal housing including a cover.
Figure 12:
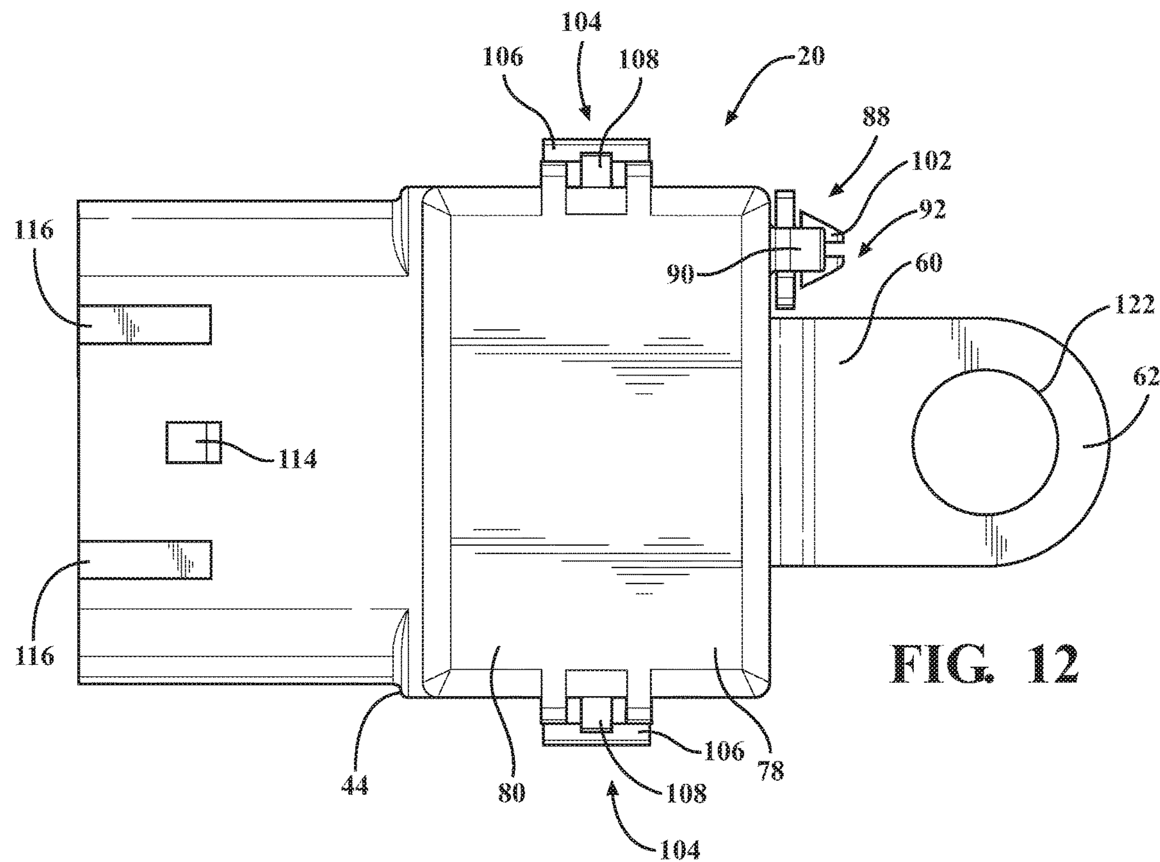
FIG. 12 is a plan view of the terminal housing including the cover.
Figures 13, 14:
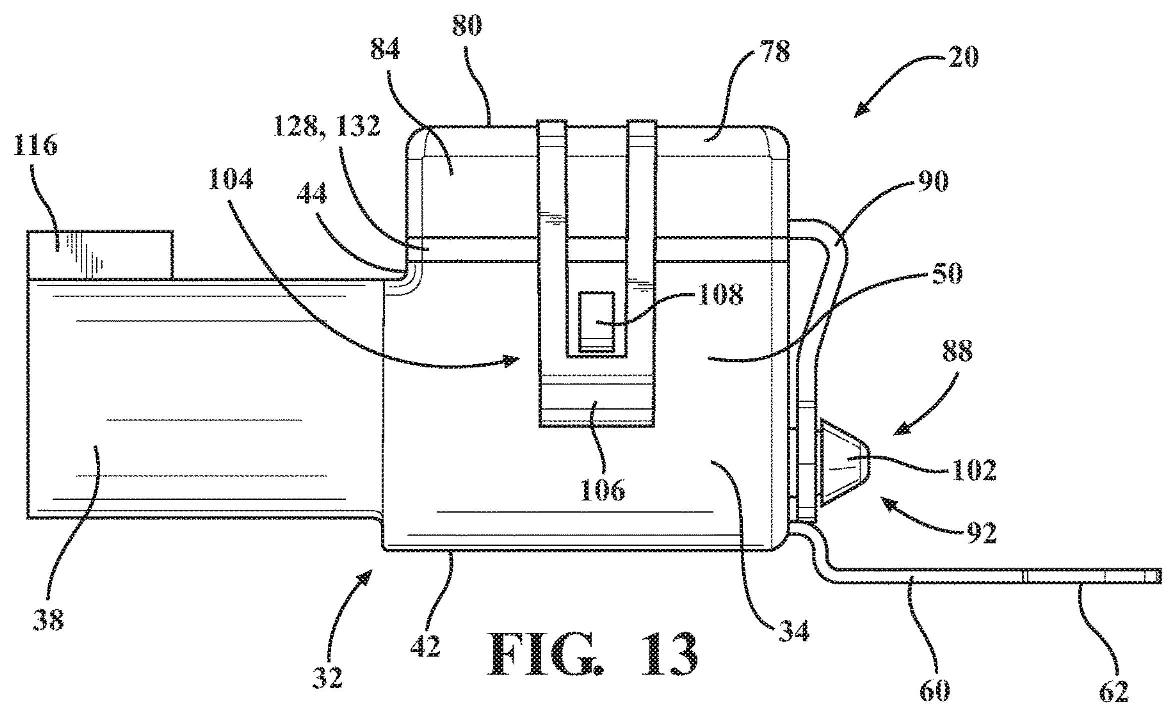
FIG. 13 is a side view of the terminal housing including the cover.
FIG. 14 is a perspective view of the terminal housing including the cover.

Referring to FIGS. 8-10, the wiring harness plug 26 may be mounted to the electrical cable 24 in any suitable fashion. For example, the wiring harness plug 26 may be overmolded over the electrical cable 24. Alternatively, the wiring harness plug 26 may be configured to assemble over the electrical cable 24, for example, as a clamshell configuration. The wiring harness plug 26 includes a harness housing 28 and a first electrical connector 30. The first electrical connector 30 may include at least one biased prong 120 configured to receive and selectively retain the second electrical connector(s) 72 such that the first electrical connector(s) 30 and second electrical connector(s) 72 are engaged in electrical communication. The harness housing 26 may include seals at various locations (such as where the electrical cable enters the harness housing, or where the receptacle engages the harness plug) to ensure that debris and liquid does not penetrate the electrical components.

Referring to FIG. 9, the harness housing 28 may define a generally rectangular slot 70 configured to engage the receptacle 38. As shown in FIG. 10, the receptacle 38 of the terminal housing 32 may engage the slot 70 of the wiring harness plug 26 with the first electrical connector(s) 30 and second electrical connector(s) 72 engaging each other to couple the cable 24 with the second terminal(s) 68 in electrical communication. In other words, the receptacle 38 is configured to engage the wiring harness plug 26 such that the "female" first electrical connector(s) 30 may receive the "male" second electrical connector(s) 72 to engage each other in electrical communication, facilitating the transfer of power between the second terminal 68 and the electrical cable 24.

With continued reference to FIG. 3 and FIGS. 8-10, to facilitate the receptacle 38 engaging the wiring harness plug 26, the receptacle 38 may include one or more alignment ribs 116 and the harness housing 28 may include one or more grooves 118 corresponding to the alignment ribs 116, wherein the grooves 118 are configured to receive the alignment ribs 116 to align the receptacle 38 and the slot 70 of the wiring harness plug 26 for engagement such that the first electrical connector(s) 30 and second electrical connector(s) 72 are also aligned for engagement.

Referring again to FIG. 3 and FIGS. 8-10, the wiring harness plug 26 and the receptacle 38 may include a clip system 110 configured to selectively secure the wiring harness plug 26 to the receptacle 38. The clip system 110 may include a clip 112 disposed on the wiring harness plug 26 and a clip receiving member 114 disposed on the receptacle 38, wherein the clip 112 and the clip receiving member 114 are capable of being coupled such that the wiring harness plug 26 is selectively secured to the receptacle 38. For example, the clip 112 may be disposed on a top surface 29 of the harness housing 28, and the clip receiving member 114 may be disposed on the top side 52 of the receptacle 38. Advantageously, the wiring harness plug 26 and the clip system 110 provide a secure, removable connection for selectively coupling the electrical cable 24 with the terminal housing 32.

Referring to FIGS. 11-15, the wiring harness assembly 20 includes a cover 78 removably mounted to the terminal housing 32 to sealably cover the first cavity 36 for protecting the electrical fuse 22 within the first cavity 36. The cover 78 includes an upper face 80, a lower face 82 opposing the upper face 80, an inner wall 84 and an outer wall 85 extending from the lower face 82 and defining a channel 86 around a perimeter of the lower face 82. The cover 78 may be removably mounted to the terminal housing 32 using a latching system 104. The latching system 104 may include a latch 106 disposed on the cover 78 and a latch receiving member 108 disposed on the main body 34 of the housing 32. For example, the latch 106 may extend from the outer wall 85, and the latch receiving member 108 may be disposed on the third side 48 and/or fourth side 50 of the main body 34 of the terminal housing 32 (shown in FIGS.

14 and 15). In other words, the latching system 104 is arranged on a side of the terminal housing 32 orthogonal from the first face 44 of the housing 32 including receptacle 38, as the first side 44 would not have enough space to accommodate the latching system 104. Advantageously, the latch 106 and the latch receiving member 108 are capable of being coupled such that the cover 78 may be removably coupled to the terminal housing 32 in a secure manner.

Figures 15, 16:
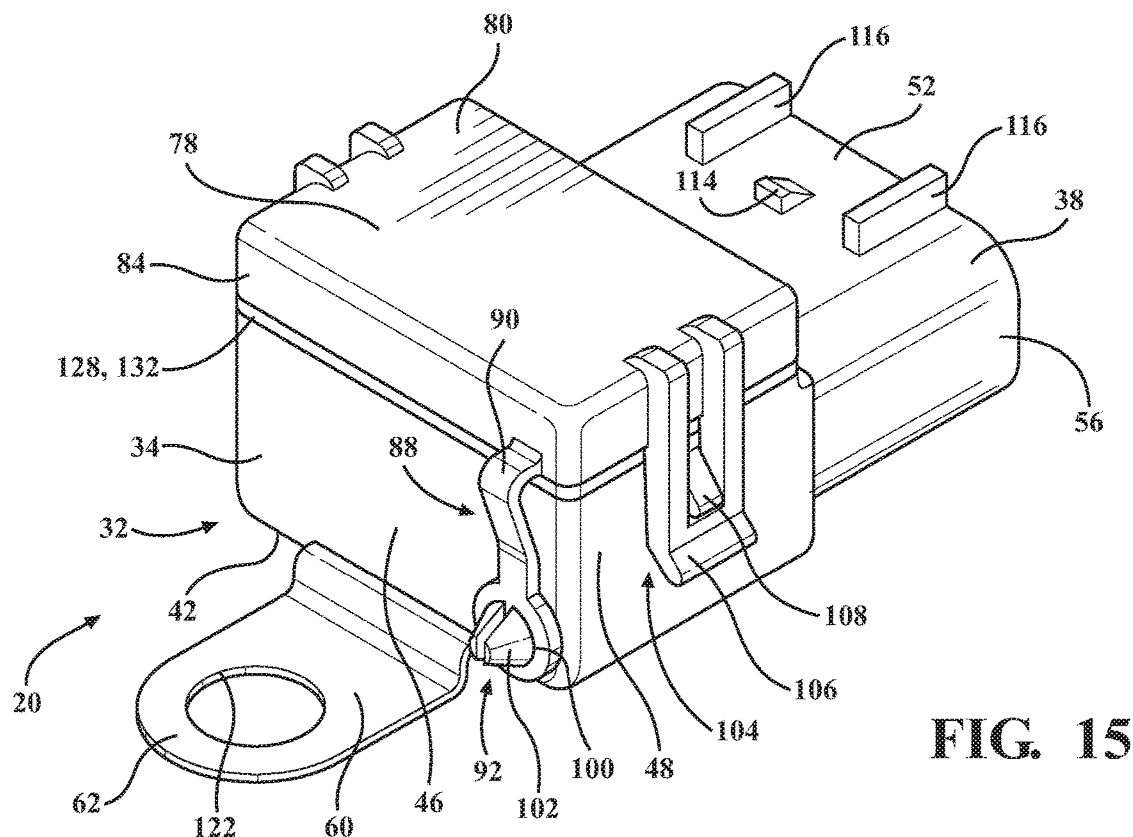
FIG. 15 is another perspective view of the terminal housing including the cover.
FIG. 16 is a partial cross-sectional view of the terminal housing including the cover and a sealing member.

Referring to FIG. 3 and FIG. 16, the wiring harness assembly 20 further includes a fuse spacer 128 configured to be disposed within the first cavity 36 of the main body 34. The fuse spacer 128 includes defined compartments 130 for guiding the electrical fuse 22 into engagement with the first contacting ends 66 and second fuse contacting ends 76. Particularly, the defined compartments 130 are generally aligned with the first contacting ends 66 and second fuse contacting ends 76 for guiding the electrical fuse 22 into engagement with the first contacting ends 66 and second fuse contacting ends 76. Additionally, the fuse spacer 128 also includes a peripheral flange 132 configured to be arranged between the cover 78 and the main body 34. Particularly, the peripheral flange 132 is configured to be arranged between the outer wall 85 of the cover 78 and the rectangular cross section defined by the first side 44, second side 46, third side 48, and fourth side 50 of the main body 34.

Additionally, referring to FIG. 16, the cover 78 includes a sealing member 124 to facilitate a seal between the cover 78 and the terminal housing 32. Particularly, the sealing member 124 may be disposed in the channel 86 defined by the inner wall 84 and the outer wall 85 the cover 78, such that the sealing member 124 abuts the inner wall 84 and the outer wall 85 of the cover 78. When the cover 78 is secured to the main body 34, the sealing member 124 is configured to abut the spacer 128 to form a seal. Similarly, a second sealing member (not shown) is also contemplated to be disposed between the main body 34 and the spacer 128 to form a seal therein.

Figure 4:
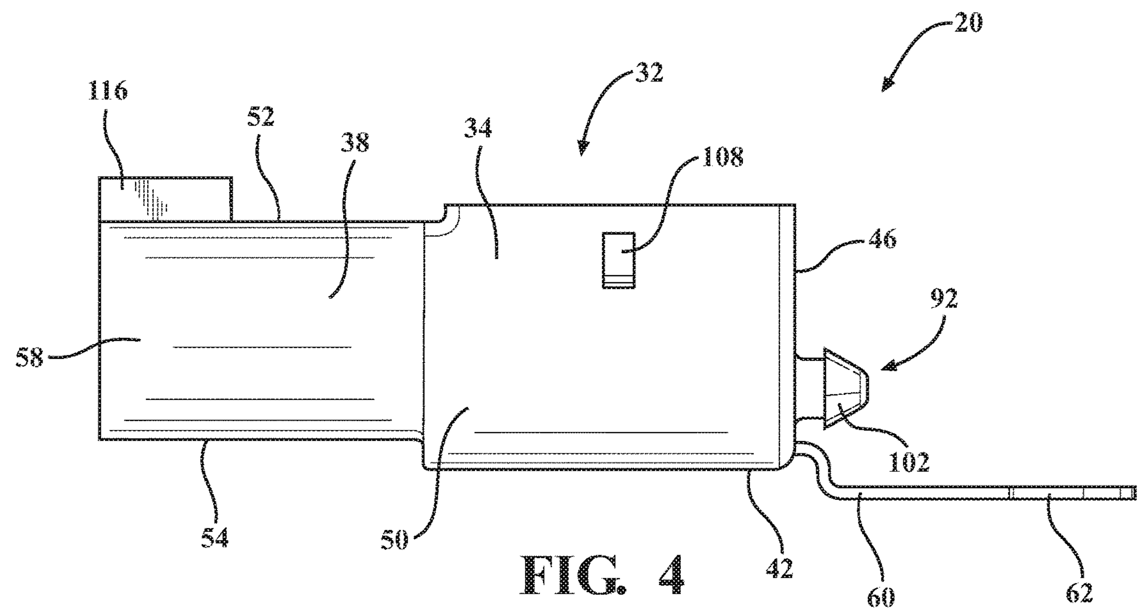
FIG. 4 is a side view of a terminal housing including a first terminal.

Referring to FIGS. 11-15, the wiring harness assembly 20 further includes a retaining system 88 interconnecting the cover 78 and the terminal housing 32 to maintain connection of the cover 78 to the terminal housing 32 when the cover 78 is removed from the terminal housing 32. Advantageously, the cover 78 and the terminal housing 32 are interconnected so the cover 78 is not misplaced when the cover 78 is removed. The retaining system 88 may include a tether 90 mounted to one of the cover 78 and the terminal housing 32 and an attachment fixture 92 mounted to the other of the cover 78 and the terminal housing 32. Referring to FIG. 15, the tether 90 may be integrally formed with the cover 78. Additionally, the tether 90 may define an opening 100 configured to receive the attachment fixture 92. As illustrated in FIG. 4 and FIG. 5, the attachment fixture 92 may include a barb 102 configured to engage the tether 90.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A wiring harness assembly for serviceably housing at least one electrical fuse, said wiring harness assembly comprising:

at least one electrical cable; a wiring harness plug mounted to said cable with said wiring harness plug including a harness housing and a first electrical connector; a terminal housing including a main body defining a first cavity and a receptacle defining a second cavity; a first terminal including a mounting end adapted for receiving a stud, and at least one first fuse contacting end disposed within said first cavity of said terminal housing; at least one second terminal including a first end defining a second electrical connector disposed within said second cavity of said terminal housing, and at least one second fuse contacting end disposed within said first cavity of said terminal housing: wherein said first fuse contacting end of said first terminal and said second fuse contacting end of said second terminal are positioned within said first cavity parallel to and facing each other for receiving the electrical fuse; and wherein said receptacle of said terminal housing receives said wiring harness plug with said first and second electrical connectors engaging each other in electrical communication to electrically couple said cable to said first and second terminals; a cover removably mounted to said terminal housing to sealably cover said first cavity for protecting the electrical fuse within said first cavity; and a retaining system interconnecting said cover and said terminal housing to maintain connection of said cover to said terminal housing when said cover is removed from said terminal housing with said retaining system including a tether mounted to one of said cover and said terminal housing and an attachment fixture mounted to the other of said cover and said terminal housing.

2. The wiring harness assembly as set forth in claim 1, wherein said at least one first fuse contacting end is further defined as a plurality of fuse contacting ends, with each of said first fuse contacting ends being spaced apart from each other for receiving a plurality of electrical fuses with said plurality of said first fuse contacting ends and said mounting end being integrally connected.

3. The wiring harness assembly as set forth in claim 2, wherein said mounting end of said first terminal is further defined as a single mounting end for receiving said stud.

4. The wiring harness assembly as set forth in claim 1, further including a plurality of said second terminals wherein each of said second fuse contacting ends are spaced apart from each other for receiving a plurality of electrical fuses and each of said second electrical connectors are spaced apart from each other.

5. The wiring harness assembly as set forth in claim 1, wherein said tether is mounted to said cover and said attachment fixture is mounted to said terminal housing.

6. The wiring harness assembly as set forth in claim 1, wherein said tether is integrally formed with said cover.

7. The wiring harness assembly as set forth in claim 1, wherein said tether defines an aperture configured to receive said attachment fixture.

8. The wiring harness assembly as set forth in claim 1, wherein said attachment fixture includes a barb configured to engage said tether.

9. The wiring harness assembly as set forth in claim 1, further including a latching system configured to selectively secure said cover to said terminal housing.

10. The wiring harness assembly as set forth in claim 9, wherein said latching system includes a latch disposed on said cover and a latch receiving member disposed on said terminal housing, wherein said latch and said latch receiving member are capable of being coupled such that said cover is selectively secured to said terminal housing.

11. The wiring harness assembly as set forth in claim 9, wherein said latching system is arranged on a side of said main body orthogonal from said receptacle.

12. The wiring harness assembly as set forth in claim 1, further including a clip system configured to selectively secure said wiring harness plug to said receptacle.

13. The wiring harness assembly as set forth in claim 12, wherein said clip system includes a clip disposed on said wiring harness plug and a clip receiving member disposed on said receptacle, wherein said clip and said clip receiving member are capable of being coupled such that said wiring harness plug is selectively secured to said receptacle.

14. The wiring harness assembly as set forth in claim 1, wherein said receptacle includes one or more alignment ribs and wherein said harness housing includes one or more grooves corresponding to said alignment ribs, wherein said grooves are configured to receive said alignment ribs to align said receptacle and said wiring harness plug for engagement.

15. The wiring harness assembly as set forth in claim 1, wherein said first electrical connector includes at least one biased prong configured to receive and selectively retain said second electrical connector such that said first and second electrical connectors are engaged in electrical communication.

16. The wiring harness assembly as set forth in claim 1, wherein said mounting end defines an opening configured to receive said stud.

17. The wiring harness assembly as set forth in claim 1, wherein said cover includes a sealing member to facilitate a water tight seal between said cover and said terminal housing.

18. The wiring harness assembly as set forth in claim 17, wherein said sealing member is disposed in a channel defined by an inner wall and an outer wall of said cover.

19. The wiring harness assembly as set forth in claim 1, further including a fuse spacer disposed within said first cavity with said fuse spacer including defined compartments for guiding the electrical fuse into engagement with said first and second fuse contacting ends.

20. The wiring harness assembly as set forth in claim 19, wherein said fuse spacer further includes a peripheral flange configured to be arranged between said cover and said terminal housing.

* * * * *